3,003,901
NON-CORROSIVE SOLDERING FLUX AND METHOD OF MAKING SAME
Sam Anthony Marcell, 8532 Troy Ave., Lemon Grove, Calif.
No Drawing. Filed Nov. 8, 1960, Ser. No. 67,920
2 Claims. (Cl. 148—23)

The present invention relates generally to fluxes and more particularly to a non-corrosive soldering flux and method of making same.

The primary object of this invention is to provide a soldering flux containing stabilizing ingredients which resist corrosion by salt water and prevent scaling or loosening of soldered joints normally caused by such corrosion.

Another object of this inventon is to provide a soldering flux which is fast acting and does not require the through cleaning of the joint areas necessary with some types of flux.

A further object of this invention is to provide a soldering flux which is prepared in such a manner as to ensure proper mixing of the ingredients for uniformity.

Finally, it is an object to provide a soldering flux of the aforementioned character which is simple, safe and convenient to prepare and use and which will give consistent and reliable results.

With these and other objects definitely in view, this invention consists in the novel combination and arrangement of elements and portions, as will be hereinafter fully described in the specification and particularly pointed out in the claims.

The formula for the flux is as follows:

| | Parts by weight |
|---|---|
| Rosin (lump form) (approx.) | 32 |
| Isopropyl alcohol (approx.) | 32 |
| Glycerin (or castor oil) (approx.) | 16 |
| Camphor-alcohol solution (approx.) | 1 |

In preparing the flux it is essential that the rosin is first dissolved in the isopropyl alcohol, in order to ensure complete dissolving. This forms a primary solution, the alcohol being a solvent for the rosin. The camphor solution is prepared next by first dissolving camphor in isopropyl alcohol in the proportion of 1 part camphor to 4 parts of alcohol, by weight and then the camphor solution is added to a stabilizer which is either glycerin or castor oil in the proportion of ½ dram of camphor solution to ½ ounce of glycerin or castor oil, the resultant constituting what will be termed the stabilizer-camphor solution. As mentioned above, castor oil may be substituted for the glycerin if desired. The stabilizer-camphor solution is then added to the primary solution a little at a time and mixed thoroughly.

The use of rosin in fluxes is well known, but many such fluxes provide no protection for the soldered joint at the joint face where corrosion often begins. Salt water is particularly active in causing corrosion in solder and destroying the bond of the solder to the joint surfaces. In the flux described herein, the camphor with glycerin or castor oil act as effective stabilizers and prevent the initiation of such corrosion. The flux is non-corrosive and completely safe to use and contains no ingredients which are harmful, in any way, to the materials on which such a flux is used. The materials include virtually all metals which can be soldered, such as iron work, cooper, brass, galvanized iron and the like.

In soldering iron parts, no meticulous scraping or prolonged cleaning is necessary, while on copper parts, the lacquer often used for protective purposes need not be laboriously removed, the alcohol in the flux acting to dissolve any small particles of lacquer.

The following examples will serve to illustrate the reduction of this invention to practice.

EXAMPLE 1

A flux is prepared by dissolving 1 ounce of rosin in 1 ounce of isopropyl alcohol, separately dissolving 1 dram of camphor in 4 drams of isopropyl alcohol and adding 1 dram of this camphor-alcohol solution to ½ ounce of glycerin, and slowly mixing the rosin alcohol solution with the camphor-alcohol-glycerin solution with constant agitation, applying the flux to both of the mating portions of the metal parts to be soldered together, preferably using a brush or the like, and then soldering the mating parts together in the conventional manner.

EXAMPLE 2

A flux is prepared by dissolving 1 ounce of rosin in 1 ounce of isopropyl alcohol, separately dissolving 1 dram of camphor in 4 drams of isopropyl alcohol and adding 1 dram of this camphor-alcohol solution to ½ ounce of castor oil, and slowly mixing the rosin alcohol solution with the camphor-alcohol-castor oil solution with constant agitation, applying the flux to both of the mating portions of the metal parts to be soldered together, preferably using a brush or the like, and then soldering the mating parts together in the conventional manner.

EXAMPLE 3

(*Method of making flux*)

Dissolve one pound of lump form rosin in one pound of isopropyl alcohol. Separately dissolve four one-ounce cakes of camphor in one pound of isopropyl alcohol and add ½ ounce of this last mentioned solution to ½ pound of glycerin. Then mix the camphor-alcohol-glycerin solution with the rosin-alcohol solution, with agitation.

EXAMPLE 4

(*Method of making flux*)

Dissolve one pound of lump form rosin in one pound of isopropyl alcohol. Separately dissolve four one-ounce cakes of camphor in one pound of isopropyl alcohol and add ½ ounce of this last mentioned solution to ½ pound of castor oil. Then mix the camphor-alcohol-castor oil solution with the rosin-alcohol solution, with agitation.

The flux has been found to be extremely fast acting, the joint being ready for soldering virtually as soon as heat is applied to the fluxed area. The non-corrosive properties of the flux are particularly advantageous in plumbing installations and in marine applications where the joints may have prolonged exposure to moisture, especially where salty air and water are encountered.

Other advantages will now be apparent. There are no acids used and the flux does not injure the hands. Furthermore, there are no toxic fumes given off in the use of the flux as in many other fluxes. It is also noteworthy that, by reason of the non-toxic character of the flux, it can be more safely used in connection with metal food containers, particularly in canning.

I claim:

1. A non-corrosive soldering flux consisting essentially by weight, of: rosin, 32 parts; isopropyl alcohol, 32 parts; a stabilizer from the group consisting of glycerin and caster oil, 16 parts; and 1 part of a solution of camphor in alcohol in the proportion of 1 part camphor to 4 parts alcohol.

2. A method of making a non-corrosive soldering flux, consisting essentially of: dissolving a quantity of rosin in a substantially equal quantity, by weight, of isopropyl alcohol; preparing a solution of camphor in the proportion of approximately 1 part camphor to 4 parts alcohol; mixing a stabilizer from the group consisting of glycerin and castor oil to the camphor solution in the proportion of approximately 1 part camphor solution to 16 parts of the stabilizer; and adding the stabilizer-camphor solution to the rosin-alcohol solution slowly while mixing thoroughly.

References Cited in the file of this patent

UNITED STATES PATENTS

| | | |
|---|---|---|
| 2,596,466 | Bowden | May 13, 1952 |

FOREIGN PATENTS

| | | |
|---|---|---|
| 20,858 | Australia | June 25, 1929 |
| 105,339 | Australia | Apr. 7, 1938 |